(12) United States Patent
Hong et al.

(10) Patent No.: US 9,636,544 B2
(45) Date of Patent: May 2, 2017

(54) DIAMOND TYPE CAM FOR ROCK CLIMBING

(71) Applicant: Seul-Min Hong, Gyeongsangnam-do (KR)

(72) Inventors: Seul-Min Hong, Gyeongsangnam-do (KR); Seong Hyeon Choe, Ulsan (KR); Sang-Kown Hong, Gyeongsangnam-do (KR); Sun-Gi Jung, Gyeongsangnam-do (KR); Seong-Hyeon Hong, Gyeongsangnam-do (KR)

(73) Assignee: Seul-Min Hong, Gyeongsangnam-do (KR)

( * ) Notice: Subject to any disclaimer, the term of this patent is extended or adjusted under 35 U.S.C. 154(b) by 0 days.

(21) Appl. No.: 14/893,511

(22) PCT Filed: Dec. 1, 2014

(86) PCT No.: PCT/KR2014/011621
§ 371 (c)(1),
(2) Date: Nov. 23, 2015

(87) PCT Pub. No.: WO2015/088169
PCT Pub. Date: Jun. 18, 2015

(65) Prior Publication Data
US 2016/0129312 A1 May 12, 2016

(30) Foreign Application Priority Data

Dec. 13, 2013 (KR) .................. 10-2013-0155397

(51) Int. Cl.
*A47F 5/08* (2006.01)
*A63B 29/02* (2006.01)
(Continued)

(52) U.S. Cl.
CPC .............. *A63B 29/02* (2013.01); *A63B 29/00* (2013.01); *A63B 29/024* (2013.01); *F16B 2/04* (2013.01); *F16B 2/18* (2013.01)

(58) Field of Classification Search
CPC ......... A63B 29/024; A63B 29/00; A62B 1/04; A62B 1/00; F16B 2/04; F16B 2/18
See application file for complete search history.

(56) References Cited

U.S. PATENT DOCUMENTS

| 4,491,291 A * | 1/1985 | Ching ................. A63B 29/024 248/231.9 |
| 4,643,377 A * | 2/1987 | Christianson ........ A63B 29/024 248/231.9 |

(Continued)

FOREIGN PATENT DOCUMENTS

| EP | 0226829 A1 | 7/1987 |
| EP | 1557202 A1 | 7/2005 |

(Continued)

*Primary Examiner* — Amy Sterling
(74) *Attorney, Agent, or Firm* — Farjami & Farjami LLP

(57) ABSTRACT

A diamond type cam for rock climbing is provided, which includes a body having an operating member provided thereon, a slide member slidably coupled to the body, a plurality of extension cams each of which has one end that is rotatably coupled to the body and the slide member and an extended end portion that is rotatably hinge-coupled, and a plurality of wires each of which has one end that is coupled to a predetermined position of a lower portion of the extension cam and the other end that is rotatably coupled to a predetermined position of the slide member.

10 Claims, 6 Drawing Sheets

(51) Int. Cl.
*A63B 29/00* (2006.01)
*F16B 2/04* (2006.01)
*F16B 2/18* (2006.01)

(56) References Cited

U.S. PATENT DOCUMENTS

| | | |
|---|---|---|
| 6,079,761 A | 6/2000 | Sadeck |
| 2006/0231708 A1 | 10/2006 | Robertson |
| 2006/0237979 A1 | 10/2006 | Wooten |

FOREIGN PATENT DOCUMENTS

| | | |
|---|---|---|
| KR | 100104477 B1 | 5/1996 |
| KR | 2020090003977 | 5/2011 |

* cited by examiner

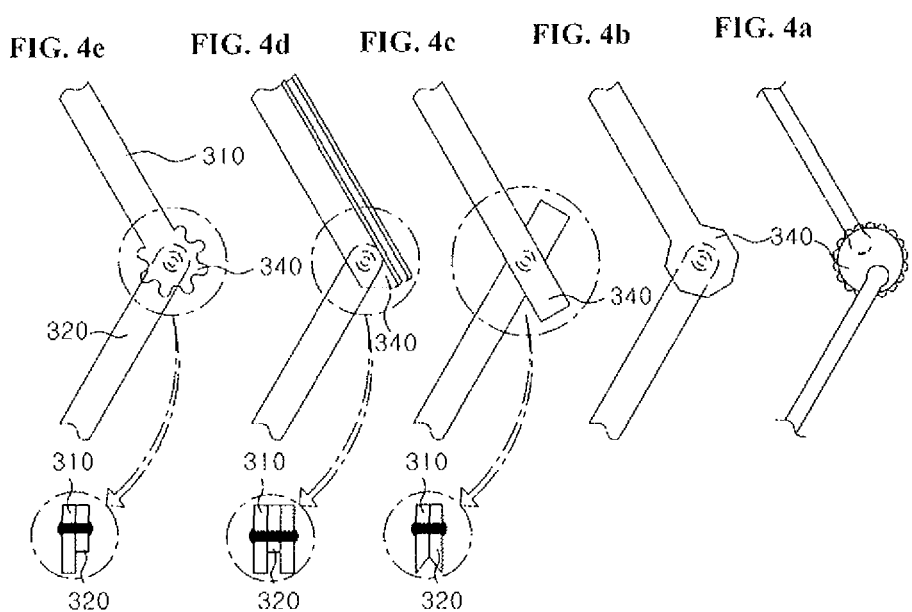

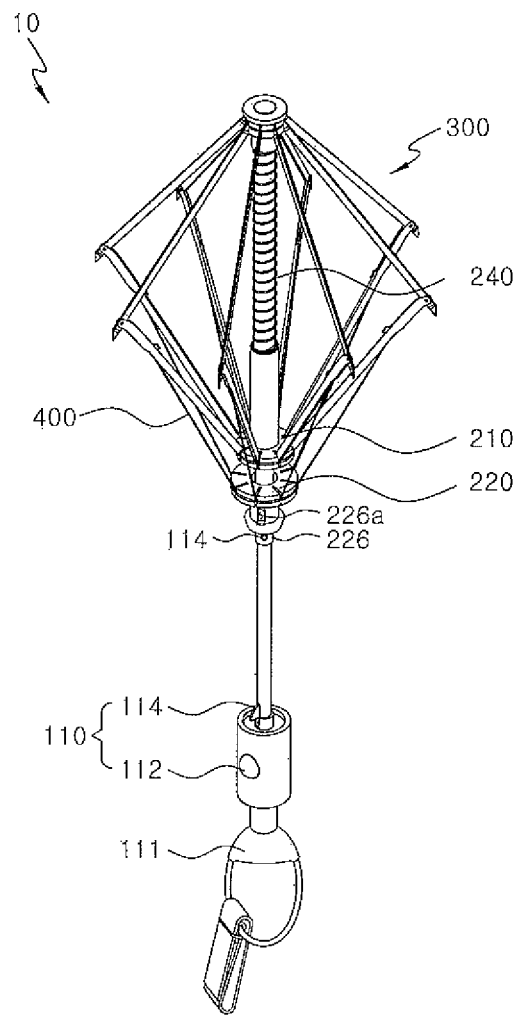

DIAMOND TYPE CAM FOR ROCK CLIMBING

This Application is a Section 371 National Stage Application, which is based on and claims priority from PCT Application Serial No. PCT/KR2014/011621, filed Dec. 1, 2014, which claims priority from foreign application Serial No. 10-2013-0155397, filed Dec. 13, 2013, in the Republic of Korea, the contents of which are hereby incorporated by reference in entirety.

TECHNICAL FIELD

The present invention relates to a diamond type cam for rock climbing. More particularly, the present invention relates to a diamond type cam for rock climbing, which makes it possible to easily and rapidly insert the cam, in which end portions of two shafts that are connected by rivet are formed of a diamond type and a spring is provided to keep an open state of the cam, into rock cracks having various sizes, and thus can secure safety of a rock climber with maximum portability and usability.

BACKGROUND ART

In general, rock climbing is performed in a manner that a climber, who climbs a rock with his/her body connected to a rope, hooks a karabina on a fixing bolt that is pre-installed on the rock, hooks the rope that ties his/her body on a bina below the karabina, and continues safe climbing to prevent falling of the climber.

Recently, many climbers prefer a climbing system using cams that are fixedly inserted into and then are removed from a well-developed rock crack rather than driving a bolt into a rock to make a hole on the surface of the rock.

A cam structure that is inserted into a crack in a rock is disclosed in Korean Utility Model Application Publication No. 20-0010088 "Cam for rock climbing".

The cam for rock climbing in the related art is configured so that a wire cable shaft is positioned in the center of the cam, a wire cam for supporting in a cross direction a cam shaft that rotatably supports the cam is fixedly connected to an end portion of the wire cable shaft, and a pulling handle for rotating the cam is movably combined with the wire cable shaft in an axial direction. The pulling handle is arranged to interlock with the cam in a folded posture through a connection member, and the cam is restrained always to take an open posture by an elastic force of a spring.

The cam for rock climbing as described above has the advantage that it enables a climber to perform rock climbing through repetition of processes of inserting cams into a crack in a rock and then removing the inserted cams from the crack. However, the cam for rock climbing also has the problem that the range of the two adjacent cams to be inserted into the rock crack is limited, and thus a climber should carry several kinds of cam sets having different sizes during his/her climbing.

Further, the rotating angle of the two adjacent cams is small, and thus in the case where the rock crack is very wide, cams that can be actually applied and used are restricted.

Further, it is required for a climber to select an appropriate cam to be inserted among several kinds of cams carried by the climber depending on the state of the rock crack, and this causes great inconvenience to the climber.

Further, since the two cams that are inserted into the rock crack have circular circumferences and the holding force of the cam becomes weak due to the weakening of the spring force, the cam that is inserted into the rock crack may move. If the cam further moves toward the inside of the crack due to such movement, it may be inserted into a space inside the crack, and thus may be unable to be withdrawn. On the other hand, if the cam moves toward the outside due to such movement, it may secede from the crack, and thus securing of safety of the climber may fail to cause danger to the climber.

In addition, since the cam has a massive structure, the cam that is used in a wide rock crack may be very heavy and large in weight and size, and thus it may be actually impossible to carry the cam that suits such a wide rock crack. In other words, the cam as described above has the structural drawback that it is unable to be used for a large crack.

Further, carrying of several cams that are limited in weight and size due to the structural characteristics as described above may cause inconvenience to the climber who desires smooth climbing.

DISCLOSURE

Technical Problem

Therefore, the present invention has been made to solve the above-mentioned problems occurring in the related art, and one subject to be achieved by the present invention is to provide a diamond type cam for rock climbing, which can be innovatively applied to rock cracks having various sizes, with minimized weight and size through rotatable combination of a plurality of elongated connection members, instead of a cam for rock climbing that has a narrow application range with respect to rock cracks due to a crossing massive structure and heavy weight.

Another subject to be achieved by the present invention is to provide a diamond type cam for rock climbing, which has minimized weight and size to be easily carried by a climber, and does not require selection of a cam having an appropriate size that suits a rock crack among cams carried by the climber.

Still another subject to be achieved by the present invention is to provide a diamond type cam for rock climbing, which can prevent the cam that is inserted into a rock crack from moving due to its semi-elliptical massive structure supported by a weak spring, and thus can prevent the cam from moving toward the inside or outside of the rock crack to prevent the cam from being not withdrawn or to prevent a climber from falling.

Yet still another subject to be achieved by the present invention is to provide a diamond type cam for rock climbing, which makes it possible to rapidly and accurately insert and fix the cam that has a simple upper/lower engagement linear structure into various rock cracks with an appropriate size in order to remove the trouble of inserting the cam into the rock crack after closing the cap using a finger.

Technical Solution

In accordance with an aspect of the present invention, there is provided a diamond type cam for rock climbing, which includes a body having an operating member provided thereon; a slide member slidably coupled to the body; a plurality of extension cams each of which has one end that is rotatably coupled to the body and the slide member and an extended end portion that is rotatably hinge-coupled; and a plurality of wires each of which has one end that is coupled to a predetermined position of a lower portion of the extension cam and the other end that is rotatably coupled to a predetermined position of the slide member.

The plurality of extension cams may include a plurality of first link bars each of which has one end that is coupled to a predetermined position of a circumference of an upper portion of the body at a predetermined interval, and a plurality of second link bars each of which has one end that is rotatably coupled to each of the plurality of first link bars and the other end that is rotatably coupled to a predetermined position of a circumference of the extension cam at a predetermined interval, wherein an end portion of any one of the plurality of first link bars and the plurality of second link bars is provided with a polygonal hook member that projects in various geometric shapes.

The slide member may include a first slide piece slidably coupled to the body, a second slide piece slidably coupled to the body to be spaced apart from the first slide piece for a predetermined distance, and a spring provided between the first slide piece and the second slide piece to apply an elastic force to the slide member.

The operation member may include a button provided in a predetermined position of a circumference of the body, and a fixing piece positioned inside the body, and having one end coupled to the button and the other end projecting from a predetermined position in a length direction of the body to be hook-coupled to the slide member.

On a circumference of the body, an elastic body, which has one end that is coupled to an upper end portion of the body and the other end that is coupled to the slide member to apply an elastic force to the slide member, is positioned.

Advantageous Effect

The diamond type cam for rock climbing according to an embodiment of the present invention can be applied to cracks having various sizes, and thus it is not required for a climber to carry several cams having various sizes.

Further, the diamond type cam for rock climbing has minimized weight and size to be easily carried by a climber, and thus it is not required for the climber to select a cam having an appropriate size that suits a rock crack among cams carried by the climber.

Further, the cam can be firmly hooked even if the cam is immediately inserted into the rock crack without the necessity of finding a cam having an appropriate side that suits the rock crack, and thus the usability can be greatly improved.

Further, since the cam can be firmly hooked by strong elastic force of the spring, the cam that is inserted into a rock crack can be prevented from moving, and thus the cam can be prevented from moving toward the inside or outside of the rock crack to prevent the cam from being not withdrawn or to prevent a climber from falling.

In addition, the cam that has a simple upper/lower engagement linear structure can be rapidly and accurately inserted and fixed into various rock cracks with an appropriate size through one operation button.

BRIEF DESCRIPTION OF THE DRAWINGS

The above objects, other features and advantages of the present invention will become more apparent by describing the preferred embodiments thereof with reference to the accompanying drawings, in which:

FIGS. 4a, 4b, 4c, 4d and 4e are exemplary views explaining a method for fastening an extension cam and a hooking member and extension cams modified in various shapes according to the present invention;

FIG. 6 is a view of a coupling example of a diamond type cam for rock climbing that is coupled to an elastic body using a tensile force according to the present invention.

DESCRIPTION OF REFERENCE NUMERALS IN THE DRAWING

Figure 1:
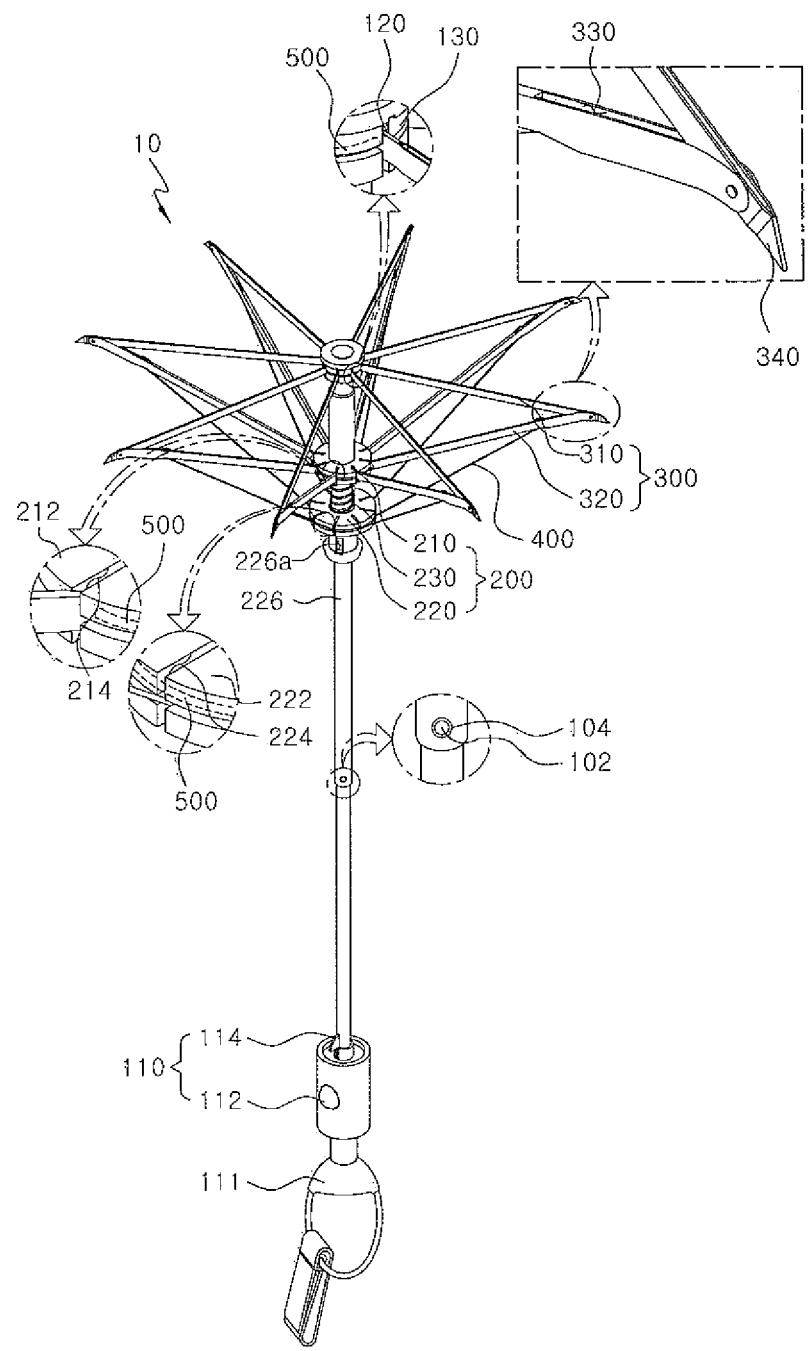
FIG. 1 is a perspective view of a diamond type cam for rock climbing according to an embodiment of the present invention.

10: diamond cam for rock climbing
100: body 102: projection 104: coupling groove
110: operation member 111: connection hook
112: button 114: fixing piece 120: cut groove
130: fastening groove 200: slide member
210: first slide piece 212: cut groove
214: fastening groove 220: second slide piece
222: cut groove 224: fastening groove
226: grip portion 226a: insertion groove
230: spring 240: elastic body
300: extension cam 310: first link bar
320: second link bar 330: cut hole 340: hook member
400: wire 500: linear material

PREFERRED EMBODIMENTS OF THE INVENTION

Hereinafter, preferred embodiments of the present invention will be described in detail with reference to the accompanying drawings. In this process, thicknesses of lines or sizes of constituent elements illustrated in the drawings may be exaggerated for clarity and convenience in explanation.

Further, all terms to be described later are defined in consideration of functions in the present invention, and may differ depending on users, operator's intentions or customs. Accordingly, definition of such terms should be made based on the contents over the whole description of the invention.

Figures 2A, 2B, 2C:
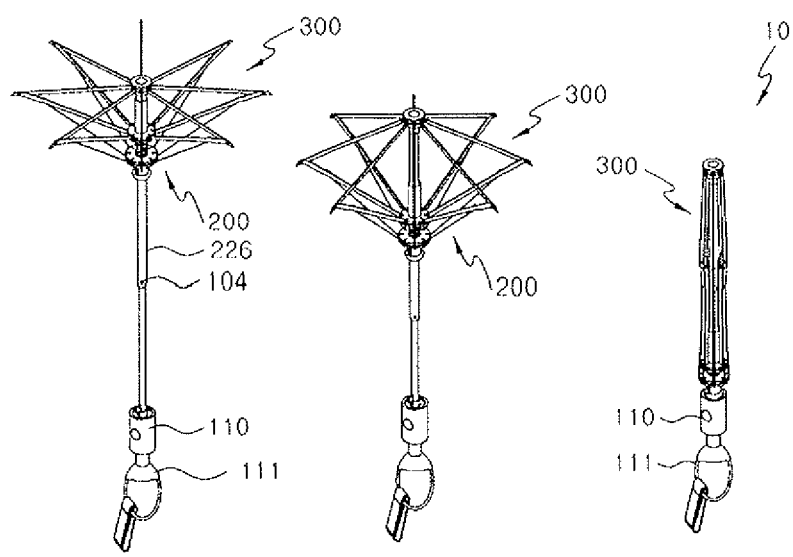
FIGS. 2a, 2b and 2c are perspective views illustrating open/close and fastened states of a diamond type cam for rock climbing according to an embodiment of the present invention.
Figure 3A:
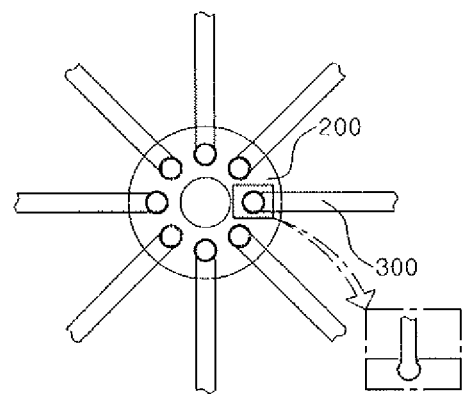
FIGS. 3a, 3b and 3c are views explaining various coupling methods of extension cams coupled to a body and a slide member provided according to the present invention.

FIG. 1 is a perspective view of a diamond type cam for rock climbing according to an embodiment of the present invention, and FIGS. 2a, 2b and 2c are perspective views illustrating open/close and fastened states of a diamond type cam for rock climbing according to an embodiment of the present invention. FIGS. 3a, 3h and 3c are views explaining various coupling methods of extension cams coupled to a body and a slide member provided according to the present invention, and FIGS. 4a, 4h, 4c, 4d and 4e are exemplary views explaining a method for fastening an extension cam and a hooking member and extension cams modified in various shapes according to the present invention. FIGS. 5a, 5h, 5c and 5d are views of use examples of a diamond type cam for rock climbing that is supported in rock cracks having different sizes according to an embodiment of the present invention, and FIG. 6 is a view of a coupling example of a diamond type cam for rock climbing that is coupled to an elastic body using a tensile force according to the present invention.

Referring to the figures, a diamond cam 10 for rock climbing according to an embodiment of the present invention includes a body 100, a slide member 200, a plurality of extension cams 300, and a plurality of wires 400.

The body 100 is provided in a hollow cylinder shape having a predetermined length, and includes an operation member 110 provided thereon.

Here, the end portion of the opposite body 100 of the operation member 100 is in a cylinder shape having a predetermined thickness and diameter, and a plurality of extension cams 300 to be described later are rotatably coupled thereto.

A plurality of bodies 100 with variable length may be provided in a manner that the plurality of bodies 100 are provided to have different diameters, and projections 102 and coupling grooves 104 are formed at both end portions of the respective bodies 10 to be insertion-coupled to each other.

In this case, the cross-sectional shape of the body 100 is basically a circle, but the body 100 may have any shape with a variable length.

The operation member 110 is provided at an end portion of the body 100 in the form of a cylinder or a polygon having a predetermined thickness and length so that a climber can easily grip the operation member 110, and includes a button 112 and a fixing piece 114.

Here, at a predetermined position of the end portion of the operation member 110, a separate connection ring 111 may be provided to facilitate the connection of a karabina or a rope.

The button 112 is provided at a predetermined position of the circumference of the body 100, and if a climber presses the button 112 using his/her thumb in a state where the climber grips the operation member 110, the button 112 is inserted into the operation member 110 and then is returned.

The fixing piece 114 is positioned inside the body 100, and has one end coupled to the button 112 and the other end that projects from a predetermined position in the length direction of the body 100 to be hook-coupled to the fixing piece 114.

That is, if the button 112 is pressed, the fixing piece 114 is inserted into the body 100, and a projection portion that projects from the end portion of the fixing piece 114 in the vertical direction is also inserted into the body 100 to make the slide member 200 that is hook-coupled to the fixing piece 114 be separated and secede from the fixing piece 114.

The sliding member 200 is slidably coupled to the circumference of the body 100, and includes a first slide piece 210, a second slide piece 220, and a spring 230.

The first slide piece 210 is provided in the form of a cylinder having a predetermined thickness and diameter, and is slidably coupled to the body 100.

Further, an upper portion of the first slide piece 210 is formed to partially project, and thus the slide member 200 slides along the length direction of the body 100 and then stops to be spaced apart from the end portion of the body 100 for a predetermined distance, so that an opening angle of the plurality of extension cams 300 does not exceed a predetermined angle.

The second slide piece 220 is provided in the form of a cylinder having a predetermined thickness and diameter, and is slidably coupled to the body 100 to be spaced apart from the first slide piece 210 for a predetermined distance.

Further, on a lower portion of the second slide piece 220, a grip portion 226 that is formed to partially project is provided, and at a predetermined position of the circumference of the grip portion 226, an insertion groove 226a is provided.

That is, by pulling the grip portion 226 of the slide member 200 that slides along the length direction of the body 100, the fixing piece 114 of the operation member 110 that is provided on the body 100 is hooked and fixed into the insertion groove 226a provided on the slide member 200.

Here, the cross-sectional shape of the first and second slide pieces 210 and 220 is basically a circle, but if the plurality of extension cams 300 to be described later are rotatably coupled to each other, the first and second slide pieces 210 and 220 may have any shape, such as a polygon.

The spring 230 is provided between the first slide piece 210 and the second slide piece 220 to apply an elastic force to the slide member 200.

The spring 230 is provided in a compression coil shape, and has one end and the other end that are coupled to the first slide piece 210 and the second slide piece 220, respectively. If the slide member 200 is coupled to the fixing piece 114 of the operation member 110 that is provided on the body, the spring is compressed to press the button 112 of the operation member 110, and the slide member 200 that is hook-fixed to the fixing piece 114 secedes from the fixing piece 114. Accordingly, by the elastic force of the compressed spring 230, the slide member 200 slides along the length direction of the body 100.

On the other hand, referring to FIGS. 5a, 5b, 5c and 5d, instead of the compression coil type spring 230 that applies the elastic force to the slide member 200 using the compression force, an elastic body 240 may be used to apply an elastic force to the slide member 200 using a tensile force.

That is, the elastic body 240, which has one end coupled to an upper end portion of the body 100 and the other end coupled to the slide member 200, is positioned on the circumference of the body 100 to apply the elastic force to the slide member 200, and if the slide member 200 is coupled to the fixing piece 114 of the operation member 110 provided on the body 100, the elastic body 240 is tensed to press the button 112 of the operation member 110. In this state, if the button 112 of the operation member 110 is pressed and the slide member 200 that is hook-fixed to the fixing piece 114 secedes from the fixing piece 114, the slide member 200 slides along the length direction of the body 100 through the elastic force of the tensed elastic body 240.

One end of each of the plurality of extension cams 300 is rotatably coupled to the body 100 and the slide member 200, and extended end portions of the extension cams 300 are rotatably hinge-coupled to each other.

That is, one and the other end portions of the plurality of extension cams 300 are rotatably hinge-coupled to a plurality of cut grooves 120 and 212 that are spaced apart from each other on predetermined positions of the inner circumferences of the body 100 having a cylindrical cross section and the first slide piece 210.

Further, on predetermined positions of the outer circumferences of the body 100 and the first slide piece 210, fastening grooves 130 and 214 having ends that are formed to communicate with the plurality of cut grooves 120 and 212 are formed along a circumferential direction, and a linear material 500 is insertion-fastened to the fastening grooves 130 and 214 to prevent the plurality of extension cams 300 that are rotatably coupled to the cut grooves 120 and 212 from seceding from the cut grooves 120 and 212.

Figure 3B:
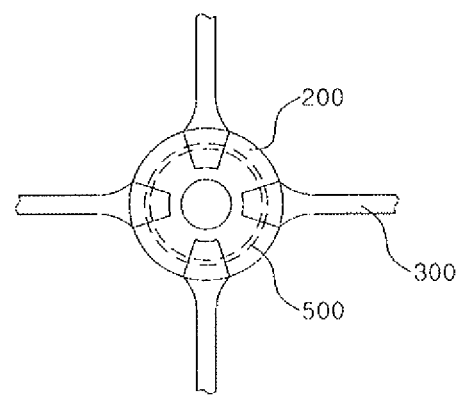
Figure 3C:
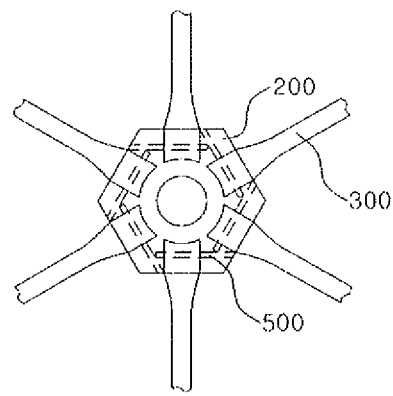
Figure 5B:
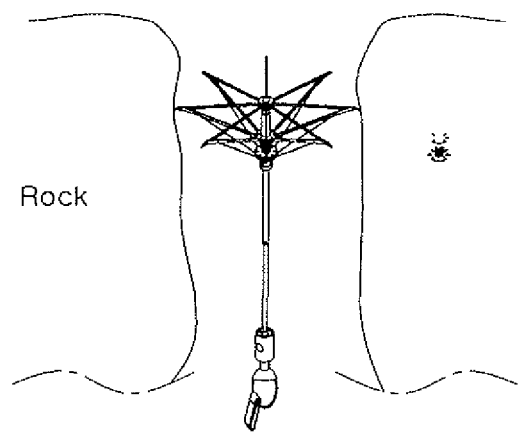
FIGS. 5a, 5b, 5c and 5d are views of use examples of a diamond type cam for rock climbing that is supported in rock cracks having different sizes according to an embodiment of the present invention.
Figure 5A:
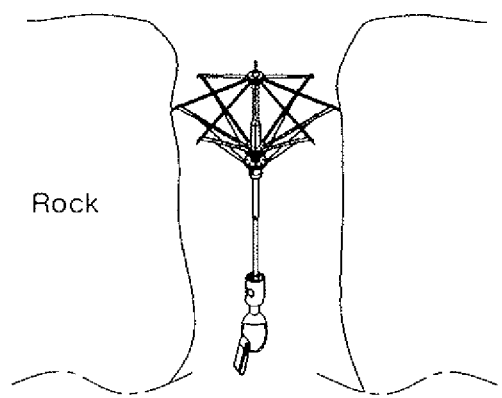
Figure 5D:
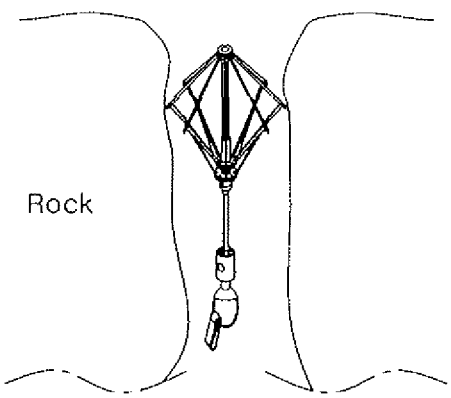
Figure 5C:
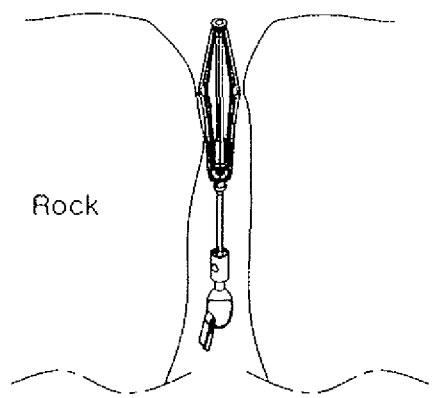

Referring to FIGS. 3a, 3b and 3c, the plurality of extension cams 300 may be provided with circular end portions that are insertion-coupled to holes formed on inner side surfaces of the body 100 and the slide member 200 through ball coupling so that the extension cams 300 are rotated.

The plurality of extension cams 300 may include a plurality of first link bars 310 each of which has one end that is rotatably coupled to a predetermined position of an upper portion of the body 100 along a circumferential direction at a predetermined interval, and a plurality of second link bars 320 each of which has one end that is rotatably coupled to the other end of each of the plurality of first link bars 310 and the other end that is rotatably coupled to a predetermined position of the outer circumference of the first slide piece 210 along the circumferential direction at a predetermined interval.

Here, it is preferable that the cross sections of the first and second link bars 310 and 320 are in a "]" shape, and a cut hole 330 is formed on an end portion of any one of the first and second link bars 310 and 320, that is, on any one of end portions that are hinge-coupled to each other. In this case, the remaining end portion is inserted into and hinge-coupled to the cut hole 330.

Here, the cut hole 330 prevents the first and second link bars 310 and 320 from interfering with each other when being rotated, and both end portions of any one of the first and second link bars 310 and 320 may be downwardly inclined to the inside or the outside, and any one of the both end portions may be longer than the other thereof.

On the other hand, referring to FIGS. 4a, 4h, 4c, 4d and 4e, a polygonal hook member 340 that projects in various geometric shapes may be provided at the end portion of any one of the first and second link bars 310 and 320.

The end portion of the hook member 340 may be provided in the form of a polygon, such as a triangle or a rectangle, or a gear, and thus the diamond type cam 10 for rock climbing that is inserted into the rock crack can be firmly fixed and supported on the side surface of the rock.

A plurality of wires 400 are provided and each of the plurality of wires 400 has one end that is coupled to a predetermined position of a lower portion of the extension cam 300 and the other end that is rotatably coupled to a predetermined position of the slide member 200.

Here, one end of each of the plurality of wires 400 is coupled to the outer circumference of the second slide piece 220 at a predetermined interval, and the other end thereof is coupled to an inner portion of the end portion of the second link bar 320 on which the cut hole 330 is formed. When the slide member 200 is hook-coupled to the operation member 110, it is inserted into an opening of the second link bar 320 that is in a "]" shape and is positioned on the inside of the second link bar 320.

Here, on the inner and outer circumferences of the second slide piece 220 that is coupled to the plurality of wires 400, cut grooves 222 and coupling grooves 224 that are equal to the cut grooves 120 and 212 and the fastening grooves 130 and 214 formed on the inner and outer circumferences of the body 100 and the first slide piece 210. Further, the plurality of wires 400 are rotatably hinge-engaged with a plurality of cut grooves 222, and the seceding thereof is prevented by the linear material 500 that is insertion-fastened to the fastening groove 224.

Hereinafter, a utilization method of the diamond type cam 100 for rock climbing as configured above will be described with reference to FIGS. 1, 2a, 2b, 2c, 5a, 5b, 5c and 5d.

First, the insertion position of the diamond type cam 100 for rock climbing is determined through confirming of the state of the rock crack.

Thereafter, through gripping of the grip portion 226 with a hand, the diamond type cam 10 for rock climbing, in which the plurality of extension cams 300 are fastened to the operation member 110, are positioned in the rock crack.

Thereafter, if the button 112 of the operation member 110 is pressed, the fixing piece 114 that is hook-coupled to the insertion groove 226a that is provided on the slide member 200 is separated from the insertion groove 226a and is inserted into the inside of the operation member 110.

Thereafter, the slide member 200 that is separated and secedes from the fixing piece 114 slides in the length direction of the body by the elastic force of the spring 230 that is compressed through the hook-coupling of the insertion groove 226a and the fixing piece 114, and the extension cams 300 that are closed in parallel to the length direction of the body 100 is opened.

Thereafter, the hook members 340 provided at the end portions of the extension cams 300 reach the side surfaces of the rock, and the elastic force of the spring 230 having one end and the other end that are coupled to the first slide piece 210 and the second slide piece 220, respectively, is kept to be applied to the extension cam 300. Accordingly, the diamond type cam 10 for rock climbing is firmly fixed and supported in the crack.

Thereafter, a rope or a karabina is selectively connected to the connection ring 111 that is provided on the operation member 110.

On the other hand, in the case of withdrawing the diamond type cam 10 for rock climbing after being used, a climber may grip the grip portion 226 provided on the second slide piece 220 by hand and pull the grip portion 226 in the length direction of the body 100.

In this case, the second slide piece 220 slides along the length direction of the body 100, and the second link bar 320 is pulled together by the wires 400 each of which has one end and the other end coupled to the second link bar 320 and the second slide piece 220 to make the first and second slide pieces 210 and 220 slide together.

Thereafter, through the sliding movement of the first and second slide pieces 210 and 220, the spring 230 that is provided between the first and second slide pieces 210 and 220 is compressed to gradually close the extension cams 300. Finally, the extension cams 300 are hook-coupled to the operation member 110 to be in a standby state for reuse.

Accordingly, the diamond type cam for rock climbing according to an embodiment of the present invention can be applied to cracks having various sizes as a kind of cam, and thus it is not required for a climber to carry several cams having various sizes.

Further, the diamond type cam for rock climbing has minimized weight and size to be easily carried by a climber, and thus it is not required for the climber to select a cam having an appropriate size that suits a rock crack among cams carried by the climber.

Further, the cam can be firmly hooked even if the cam is immediately inserted into the rock crack without the necessity of finding a cam having an appropriate side that suits the rock crack, and thus the usability can be greatly improved.

Further, since the cam can be firmly hooked by strong elastic force of the spring, the cam that is inserted into a rock crack can be prevented from moving, and thus the cam can be prevented from moving toward the inside or outside of the rock crack to prevent the cam from being not withdrawn or to prevent a climber from falling.

In addition, the cam that has a simple upper/lower engagement linear structure can be rapidly and accurately inserted and fixed into various rock cracks with an appropriate size through one operation button.

While the present invention has been described in connection with the specific embodiments illustrated in the drawings, they are merely illustrative, and the invention is not limited to these embodiments.

INDUSTRIAL APPLICABILITY

The present invention can be applied to a diamond type cam for rock climbing, which makes it possible to easily and rapidly insert the cam, in which end portions of two shafts that are connected by rivet are formed of a diamond type and a spring is provided to keep an open state of the cam, into rock cracks having various sizes, and thus can secure safety of a rock climber with maximum portability and usability.

What is claimed is:

1. A diamond type cam for rock climbing, comprising:
   a body having an operating member provided thereon;
   a slide member slidably coupled to the body;
   a plurality of extension cams each of which has one end that is rotatably coupled to the body and the slide member and an extended end portion that is rotatably hinge-coupled; and
   a plurality of wires each of which has one end that is coupled to a predetermined position of a lower portion of the extension cam and the other end that is rotatably coupled to a predetermined position of the slide member;
   wherein the plurality of extension cams comprises:
      a plurality of first link bars each of which has one end that is coupled to a predetermined position of a circumference of an upper portion of the body at a predetermined interval; and
      a plurality of second link bars each of which has one end that is rotatably coupled to each of the plurality of first link bars and the other end that is rotatably coupled to a predetermined position of a circumference of the extension cam at a predetermined interval.

2. The diamond type cam for rock climbing according to claim 1,
   wherein an end portion of any one of the plurality of first link bars and the plurality of second link bars is provided with a polygonal hook member that projects in various geometric shapes.

3. The diamond type cam for rock climbing according to claim 1, wherein the slide member comprises:
   a first slide piece slidably coupled to the body;
   a second slide piece slidably coupled to the body to be spaced apart from the first slide piece for a predetermined distance; and
   a spring provided between the first slide piece and the second slide piece to apply an elastic force to the slide member.

4. The diamond type cam for rock climbing according to claim 1, wherein the operation member comprises:
   a button provided in a predetermined position of a circumference of the body; and
   a fixing piece positioned inside the body, and having one end coupled to the button and the other end projecting from a predetermined position in a length direction of the body to be hook-coupled to the slide member.

5. The diamond type cam for rock climbing according to claim 1, wherein on a circumference of the body, an elastic body, which has one end that is coupled to an upper end portion of the body and the other end that is coupled to the slide member to apply an elastic force to the slide member, is positioned.

6. A diamond type cam for rock climbing, comprising:
   a body having an operating member provided thereon;
   a slide member slidably coupled to the body;
   a plurality of extension cams each of which has one end that is rotatably coupled to the body and the slide member and an extended end portion that is rotatably hinge-coupled; and
   a plurality of wires each of which has one end that is coupled to a predetermined position of a lower portion of the extension cam and the other end that is rotatably coupled to a predetermined position of the slide member;
   wherein the slide member comprises:
      a first slide piece slidably coupled to the body;
      a second slide piece slidably coupled to the body to be spaced apart from the first slide piece for a predetermined distance; and
      a spring provided between the first slide piece and the second slide piece to apply an elastic force to the slide member.

7. The diamond type cam for rock climbing according to claim 6, wherein the operation member comprises:
   a button provided in a predetermined position of a circumference of the body; and
   a fixing piece positioned inside the body, and having one end coupled to the button and the other end projecting from a predetermined position in a length direction of the body to be hook-coupled to the slide member.

8. The diamond type cam for rock climbing according to claim 6, wherein on a circumference of the body, an elastic body, which has one end that is coupled to an upper end portion of the body and the other end that is coupled to the slide member to apply an elastic force to the slide member, is positioned.

9. A diamond type cam for rock climbing, comprising:
   a body having an operating member provided thereon;
   a slide member slidably coupled to the body;
   a plurality of extension cams each of which has one end that is rotatably coupled to the body and the slide member and an extended end portion that is rotatably hinge-coupled; and
   a plurality of wires each of which has one end that is coupled to a predetermined position of a lower portion of the extension cam and the other end that is rotatably coupled to a predetermined position of the slide member;
   wherein the operation member comprises:
      a button provided in a predetermined position of a circumference of the body; and
      a fixing piece positioned inside the body, and having one end coupled to the button and the other end projecting from a predetermined position in a length direction of the body to be hook-coupled to the slide member.

10. The diamond type cam for rock climbing according to claim 9, wherein on a circumference of the body, an elastic body, which has one end that is coupled to an upper end portion of the body and the other end that is coupled to the slide member to apply an elastic force to the slide member, is positioned.

* * * * *